US010268189B2

(12) United States Patent
Yan

(10) Patent No.: US 10,268,189 B2
(45) Date of Patent: Apr. 23, 2019

(54) SIGNAL GUIDED CLEANING DEVICE AND SIGNAL GUIDED CLEANING SYSTEM THEREOF

(71) Applicant: Jason Yan, New Taipei (TW)

(72) Inventor: Jason Yan, New Taipei (TW)

( * ) Notice: Subject to any disclaimer, the term of this patent is extended or adjusted under 35 U.S.C. 154(b) by 0 days.

(21) Appl. No.: 14/602,558

(22) Filed: Jan. 22, 2015

(65) Prior Publication Data

US 2015/0289740 A1    Oct. 15, 2015

(30) Foreign Application Priority Data

Apr. 9, 2014    (TW) .............................. 103112958 A
Nov. 11, 2014   (TW) .............................. 103138985 A

(51) Int. Cl.
*G05D 1/00*    (2006.01)
*G05D 1/02*    (2006.01)
*A47L 9/28*    (2006.01)

(52) U.S. Cl.
CPC .......... *G05D 1/0022* (2013.01); *A47L 9/2852* (2013.01); *G05D 1/0225* (2013.01); *G05D 1/0242* (2013.01); *A47L 2201/02* (2013.01); *G05D 2201/0203* (2013.01)

(58) Field of Classification Search
None
See application file for complete search history.

(56) References Cited

U.S. PATENT DOCUMENTS

| 2006/0190133 | A1* | 8/2006 | Konandreas | A22C 17/0013 700/245 |
| 2007/0114975 | A1* | 5/2007 | Cohen | A47L 9/2857 320/149 |
| 2008/0058987 | A1* | 3/2008 | Ozick | A47L 5/30 700/250 |
| 2008/0065266 | A1* | 3/2008 | Kim | G05D 1/0225 700/245 |
| 2016/0274579 | A1* | 9/2016 | So | A47L 9/2852 |

FOREIGN PATENT DOCUMENTS

| TW | 201106911 A1 | 3/2011 |
| TW | M466627 U | 12/2013 |
| TW | M468284 U | 12/2013 |
| WO | WO2005081074 A1 | 1/2005 |

\* cited by examiner

*Primary Examiner* — Lail A Kleinman
(74) *Attorney, Agent, or Firm* — Chun-Ming Shih

(57) ABSTRACT

The present application provides a signal guided cleaning device and a signal guided cleaning system thereof. The signal guided cleaning system includes a signal emitter and a signal guided cleaning device. The signal emitter is used to emit at least one first emission signal. And the signal guided cleaning device includes a body, at least one mobile element, at least one driver, and a controlling unit. Each first signal receiver received the first emission signal in receiving range and provides a first reception instruction. Each mobile element connects with the corresponding driver. Controlling unit connects with the first signal receivers and drivers, provides a corresponding first controlling instruction according to the received first reception instruction, and drives the corresponding drivers so as to make the mobile elements drive the body forward an emitting direction of the first emission signal.

9 Claims, 14 Drawing Sheets

SIGNAL GUIDED CLEANING DEVICE AND SIGNAL GUIDED CLEANING SYSTEM THEREOF

The present application is based on, and claims priority from, Taiwan application number 103112958, filed on Apr. 9, 2014 and Taiwan application number 103138985, filed on Nov. 11, 2014, the disclosure of which is hereby incorporated by reference herein in its entirety.

BACKGROUND OF THE INVENTION

1. Field of the Invention

The present disclose relates to a cleaning device, particularly a signal guided cleaning device which is subject to emission signals for movement or returning to a charging dock.

2. Description of the Prior Art

In the Taiwan patent of a cleaning device with sweep and vacuum functions (application date: Aug. 25, 2009; application Ser. No. 098128483), the cleaning device with sweep and vacuum functions is provided with a sweeper module and a vacuum module in a body: the sweeper module is flexibly equipped with a major sweeper and a mirror sweeper, both of which are driven by a power unit, wherein the major sweeper partially exposes to and contacts the ground from the bottom opening on the sweeper module; the sweeper module which develops an opening adjacent to the top of the minor sweeper is pivoted on the body and depends on weight to freely swing.

In the Taiwan patent of an automated cleaning device with a mobile charger (application date: Aug. 29, 2013; application Ser. No. 102216216), the automated cleaning device with a mobile charger comprises an automated cleaning device and a mobile charger: the automated cleaning device is provided with a first wireless transmission module used in sending position-related signals and a power storage module providing stored electricity to the automated cleaning device; the mobile charger comprises a body, a mobile mechanism, a second wireless transmission module and a power supply module wherein the second wireless transmission module electrically connected to the mobile mechanism receives position-related signals by which the mobile mechanism drives the body toward the automated cleaning device automatically for supply of electric power to the power storage module from the power supply module. As such, the mobile charger automatically moves and charges the automated cleaning device.

In the Taiwan patent of an absorption cleaning device (application date: Aug. 2, 2013; application Ser. No. 102214605), the absorption cleaning device comprises a control circuit which is configured on a shell body and provided with an inner power module supplying electricity to internal components, a drive module driving front and rear wheels, an absorption unit absorbing ambient dust and adhering to a plane, and a dust bag configured in the shell body and corresponding to the absorption unit for collection of dust. Compared with ordinary traditional electric vacuum devices, the absorption cleaning device substitutes for manual clean, for example, a user lifting his/her wrist, because ambient dust is absorbed by the absorption unit adhering to a plane and further collected by the dust bag corresponding to the absorption unit.

In the patent of a Method of Docking an Autonomous Robot (application date: Jan. 21, 2004; application number: PCT/US2004/001504), a method of automatically docking an autonomous robot at a charge base features an autonomous robot which returns to a charge base by detecting and receiving overlap signals from the charge base.

It can be seen from above descriptions that a conventional automated cleaning device (autonomous robot) cleaning a certain space allows a mobile charger to automatically move and charge the automated cleaning device or completes docking for charging by itself. During automatic cleaning, the automated cleaning device, however, merely follows a predetermined route for cleaning but fails to controllably arrive at another location to be cleaned. Thus, the automated cleaning device still has the problem of inconvenient handling which deserves to be settled.

SUMMARY OF THE INVENTION

Accordingly, the conventional cleaning devices with some drawbacks are not good design and deserve to be modified.

Having considered all drawbacks deriving from conventional cleaning devices, the applicant/inventor successfully created a signal guided cleaning device after years of studies.

A signal guided cleaning device in the present disclosure comprises a body, first signal receivers, drivers, mobile elements and a power supply unit. In the signal guided cleaning device, the first signal receivers configured on the body receive external first emission signals within detection ranges so as to provide a first reception instruction; the drivers are configured in the body; the mobile elements configured on the bottom side of the body and connected to at least one of the drivers are driven by the drivers based on the first reception instructions to move the body toward a direction from which the first emission signals originate. The power supply unit in the body provides electricity to the signal receivers and drivers.

In the signal guided cleaning device, each of the first reception instructions has intensity proportional to the received first emission signal.

In the signal guided cleaning device, the drivers linking at least one of the first signal receivers drive the connected mobile elements according to the first reception instructions with intensity proportional to that of the received first emission signals as well as driving speed of the first drivers.

In the signal guided cleaning device, the body further comprises a controlling unit electrically connected between the first signal receivers and the drivers and used in receiving the first reception instructions for creation of at least one first controlling instruction which is transmitted to each of the drivers; the drivers depend on the received first controlling instructions and set corresponding driving speed to drive the mobile elements and further the body for movement and turn.

In the signal guided cleaning device, the first reception instructions on the basis of intensity will be correctly decoded for creation of the distinct first controlling instructions by which the drivers make outputs of different driving speeds.

A signal guided cleaning system comprises the signal emitter and the aforementioned signal guided cleaning.

In the signal guided cleaning system, the signal emitter can be a hand-held remote control device comprising an illuminant unit and a first emission unit: the illuminant unit configured in front of the hand-held remote control device emits a visible light beam; the first emission unit also configured at front-end of the hand-held remote control device sends the first emission signals along a direction identical to that of the light beam.

In the signal guided cleaning system, the signal guided cleaning device further comprises a charging connection unit linking the power supply unit and receiving external electric power which is charged into the power supply unit for storage.

In the signal guided cleaning system, the signal emitter can be a charging dock comprising a base, a prop, a plurality of first emission units and a power transmission unit: the prop is configured on the base; the first emission units configured on the prop send identical first emission signals at a predetermined angle respectively and away from the prop without overlaps; the power transmission unit configured on the prop links the charging connection unit and transmits received external electric power to the charging connection unit when the signal guided cleaning device is shifted to the charging dock.

In the signal guided cleaning system, the charging dock further comprises a second emission unit which is configured on the prop and sends second emission signals within a range less than those of the first emission signals, the signal guided cleaning device is further provided with a second signal receiver configured on the top of the body and used in receiving the second emission signals, and the drivers enable the mobile elements to turn locally until the charging connection unit faces the charging dock when the second emission signals are received by the second signal receiver.

In the signal guided cleaning system, the signal guided cleaning device further comprises a third signal receiver configured on the body and opposite to the first signal receivers and the drivers enable the mobile elements to move toward the charging dock when a third reception instruction which corresponds to the second emission signals received by the third signal receiver is created.

In the signal guided cleaning system, the body further comprises a controlling unit that is electrically connected among the first signal receivers, the second signal receiver, the third signal receiver and the drivers and creates at least one first controlling instruction, at least one second controlling instruction and at least one third controlling instruction based on the first, second and third reception instructions and transmitted to at least one of the drivers for output of a corresponding driving speed by which the drivers enable the mobile elements to move and turn the body.

In the signal guided cleaning system, the first reception instructions on the basis of intensity can be correctly decoded for creation of the first controlling instructions by which the drivers make outputs of different driving speeds.

In the signal guided cleaning system, a first connection unit is configured on the underneath of the body and near the third signal receiver, the charging dock further comprises a second connection unit located at the base and matching the first connection unit in shape and size, and the second connection unit properly joins the first connection unit when the signal guided cleaning device is shifted to the charging dock.

In the signal guided cleaning system, the first connection unit and each of the two connection units can be a recess (bump) and a bump (recess), respectively.

In the signal guided cleaning system, both the first emission units and the second emission unit can be infrared emitters from which the first emission signals and the second emission signals, that is, infrared rays, are sent.

In the signal guided cleaning system, predetermined codes with different coded formats are added into the first emission signals and the second emission signals, respectively.

A method of returning a signal guided cleaning device to a charging dock in a signal guided cleaning system comprises steps as follows:

A. The first emission signals from the first emission units on the charging dock are received by the first signal receivers of the signal guided cleaning device for creation of the corresponding first reception instructions by the first signal receivers.

B. The signal guided cleaning device drives the connected mobile elements according to the first reception instructions or the first controlling instruction that controlling unit based on the first reception instruction to generate. The drivers are based on the first controlling instruction to output corresponding driving speed so as to drive those mobile elements and body moving or turning so as to forward to the direction of the charging dock.

C. The signal guided cleaning device selects the first signal receivers or the second signal receivers to receive the second emission signal emitted by the second emission unit of the charging dock, and provides a corresponding second reception instruction. The drivers of the signal guided cleaning device controls the connected mobile element according to the second reception instruction or a second controlling instruction that the controlling unit based on the second reception instruction to generate. The drivers output corresponding driving speed according to the received second controlling instruction, and make the drivers drive the mobile element and body moving or turning so as to make the charging connection unit of the signal guided device forward to the charging dock.

D. The second signal receiver of the signal guided cleaning device receivers the second emission signal and provide a corresponding third reception instruction. The drivers of signal guided cleaning device control the connected mobile elements according to the third reception instruction or the third controlling instruction that the controlling unit of the signal guided cleaning device based on the third reception instruction to generate. The drivers based on the received third controlling instruction to drive the mobile elements, and further drive the body moving or turning to a direction of the charging dock.

E. The first connection unit on the body properly joins the second connection unit on the charging dock.

In contrast to conventional cleaning devices, the signal guided cleaning device in the present disclosure has advantages as follows:

1. The first emission signals received by the first signal receivers are used in guiding the signal guided cleaning device to move toward a direction from which the first emission signals originate.

2. In the signal guided cleaning device, the first reception instructions depending on either distinct intensity of received first emission signals or differently decoded number of first emission signals due to a distance between the first signal receivers and the signal source from which the first emission signals originate will be dissimilar to each other. Therefore, the drivers depending on the different first reception instructions or the first controlling instructions drive the mobile elements and the body to move or turn by different driving speeds.

3. The signal guided cleaning device moves toward a direction from which the first emission signals originate with the first emission units coordinating the first signal receivers and turns and links a charge dock with the second emission unit coordinating the second and third signal receivers.

4. During the trip of returning to the charging dock, the body of the signal guided cleaning device correctively and stably follows the first, second and third reception instructions or the first, second and third controlling instructions because of no emission signal from the first emission units overlapped and different detection ranges between the first emission units and the second emission unit.

BRIEF DESCRIPTION OF THE DRAWINGS

The accompanying drawings which facilitate understanding of a signal guided cleaning device for its technical measures and effects are shown as follows.

DETAILED DESCRIPTION OF THE PREFERRED EMBODIMENT

A signal guided cleaning device will be further illustrated with embodiments as well as accompanying drawings for clear understanding of its purposes, technical measures and advantages. It should be understood that the embodiments hereinafter are used to explain but not restrict a signal guided cleaning device in the present disclosure.

Figure 1:
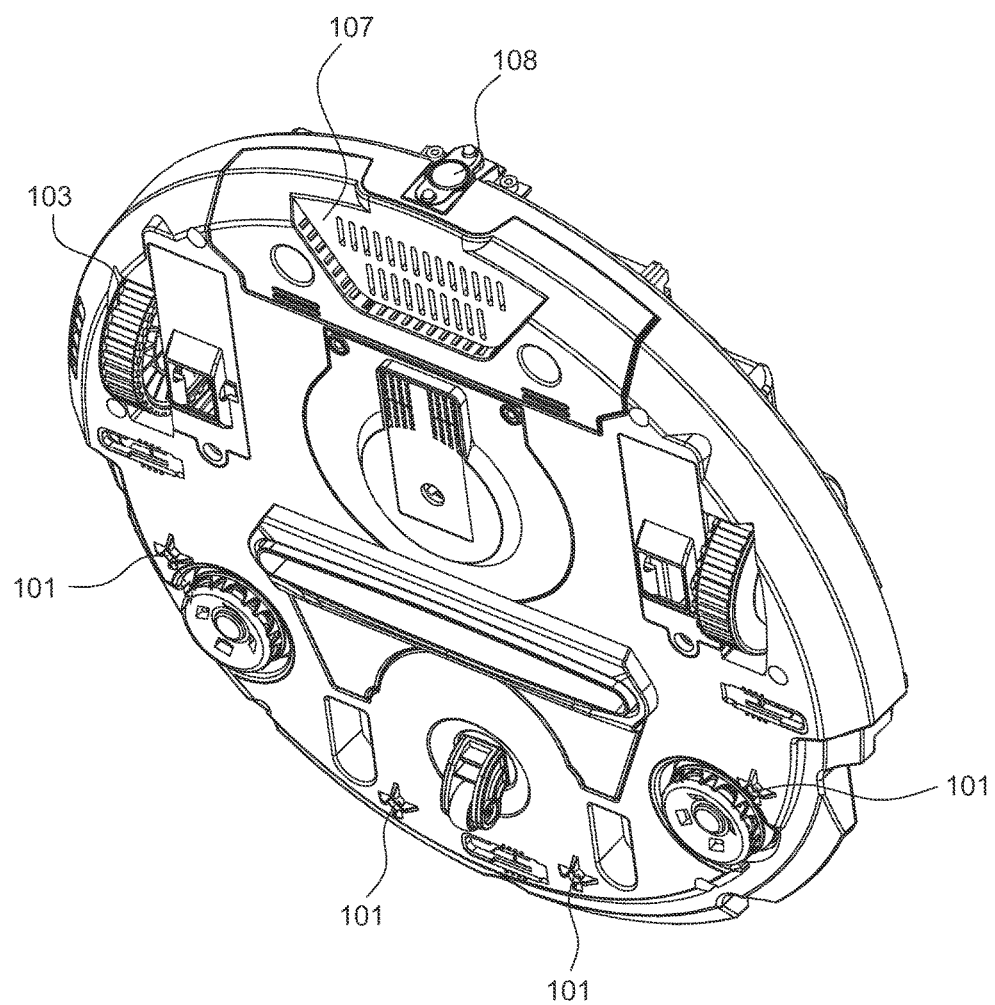
FIG. 1 shows a schematic view of a signal guided cleaning device of present application.
Figure 2:
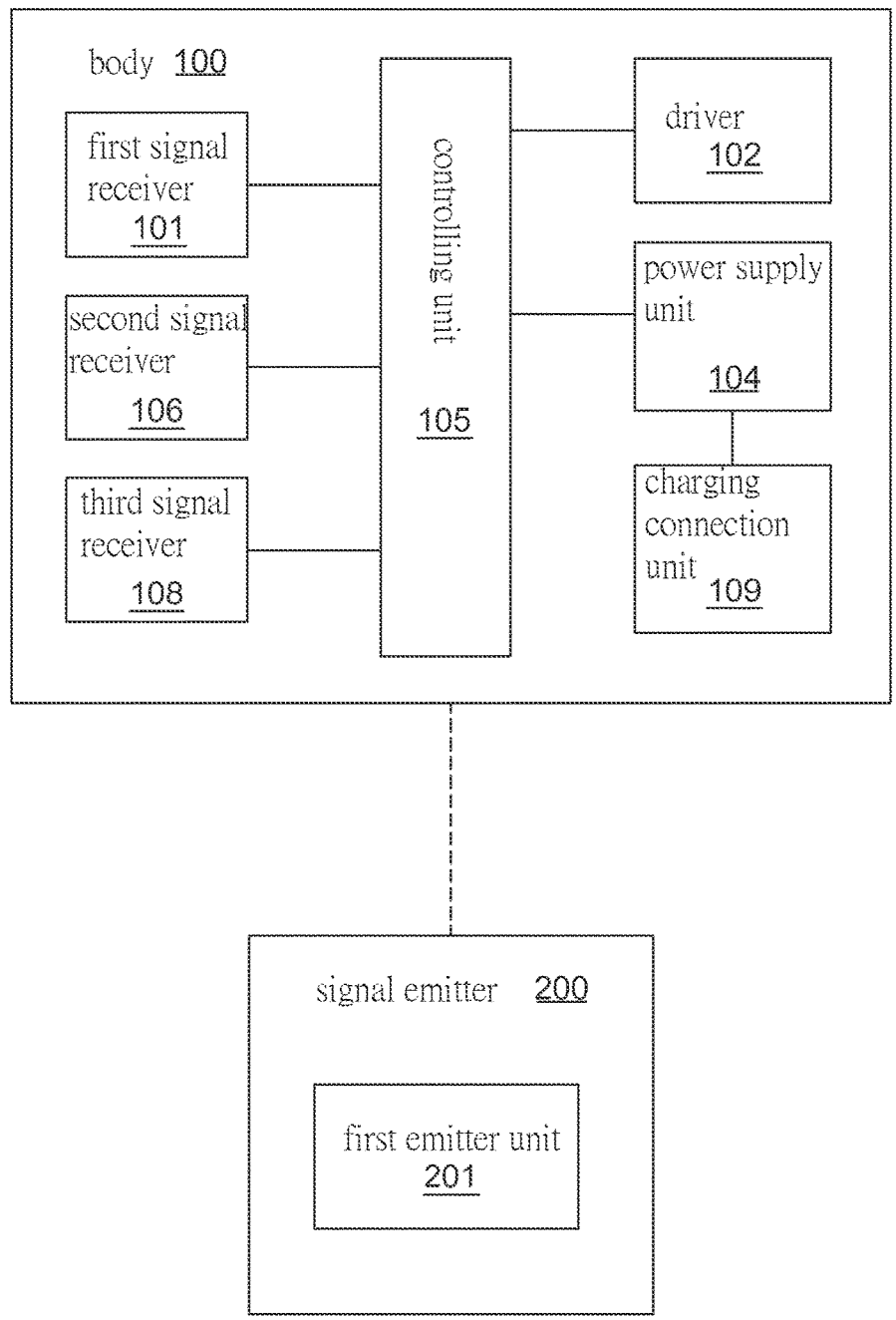
FIG. 2 shows a block diagram illustrating electrical connections of a signal guided cleaning system of present application.

Please refer to FIGS. 1 and 2 which illustrate a signal guided cleaning device comprises a body 100, a plurality of first signal receivers 101, drivers 102, mobile elements 103 and a power supply unit 104. As shown in FIGS. 1 and 2, a signal guided cleaning system comprises the aforementioned signal guided cleaning device and a signal emitter 200. And the signal guided cleaning device is guided by first emission signals from the signal emitter 200 which comprises a first emitter unit 201. The body 100 is provided with the first signal receivers 101 on one side, that is, the top side or the lateral side (FIG. 3) or the bottom side (FIG. 1) of the body 100; the first signal receivers 101 on the top side or the bottom side are also located near the lateral side and receive the first emission signals from the signal emitter 200 within a reception range for creation of a first reception instruction.

In the signal guided cleaning device, the mobile elements 103 are mounted on the bottom side of the body 100 (FIGS. 1 and 3) and the drivers 102 are configured in the body 100 wherein at least some of the mobile elements 103 are connected to one of the drivers 102 and the remaining mobile elements 103 are neither connected to nor driven by the drivers 102 and taken as driven wheels to support the body 100. Or, each of the mobile elements 103 links one of the drivers 102. Based on the first reception instructions, the drivers 102 drive the connected mobile elements 103 and further the body 100 toward the direction from which the first emission signals received by the first signal receivers 101 originate; the power supply unit 104 configured inside the body 100 provides electric power to both the signal receivers and the drivers.

In the signal guided cleaning device, the first reception instruction has intensity inversely proportional to a distance through which the first emission signal is received by the first signal receivers; the fixed intensity of the first emission signals which are closed to the first signal receivers contributes to the robust first reception instruction created by the first signal receivers. In the signal guided cleaning device, the first emission signals as coded signals with fixed intensity will be more correctly decoded by the first signal receivers and immune to interference of external signals, that is, the first signal receivers closed to the first emission signals produce the robust first reception instruction; whereas, the first emission signals which have fixed intensity but are not fully and correctly decoded by the first signal receivers imply a remote distance, which is unfavorable to the first emission signals caught by the first signal receivers, and the weak first reception instructions created by the first signal receivers. As such, the drivers 102 based on distinct levels of intensity of the first reception instructions drive the signal guided cleaning device to move at different speeds.

The body 100 further comprises a controlling unit 105 therein which is electrically connected between the first signal receivers 101 and the drivers 102 and receives the first reception instructions, creating at least one first controlling instruction which depends on distinct levels of intensity of the first reception instructions and is transmitted to the drivers 102 that make output of a corresponding driving speed, allowing the mobile elements 103 to move and turn the body 100.

Figure 4:
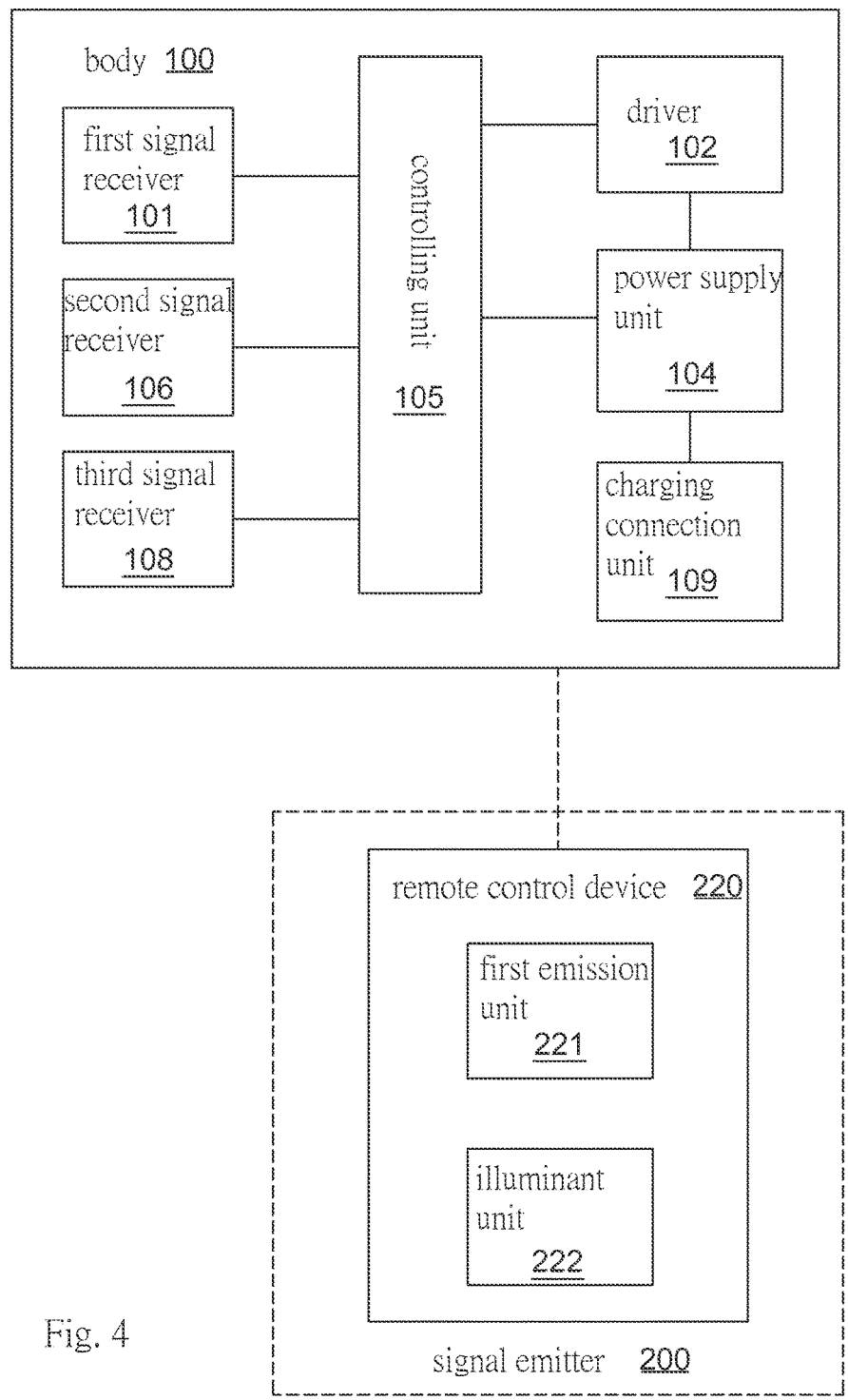
FIG. 4 shows a block diagram of signal guided cleaning device and a hand-held remote control device of present application.
Figure 5:
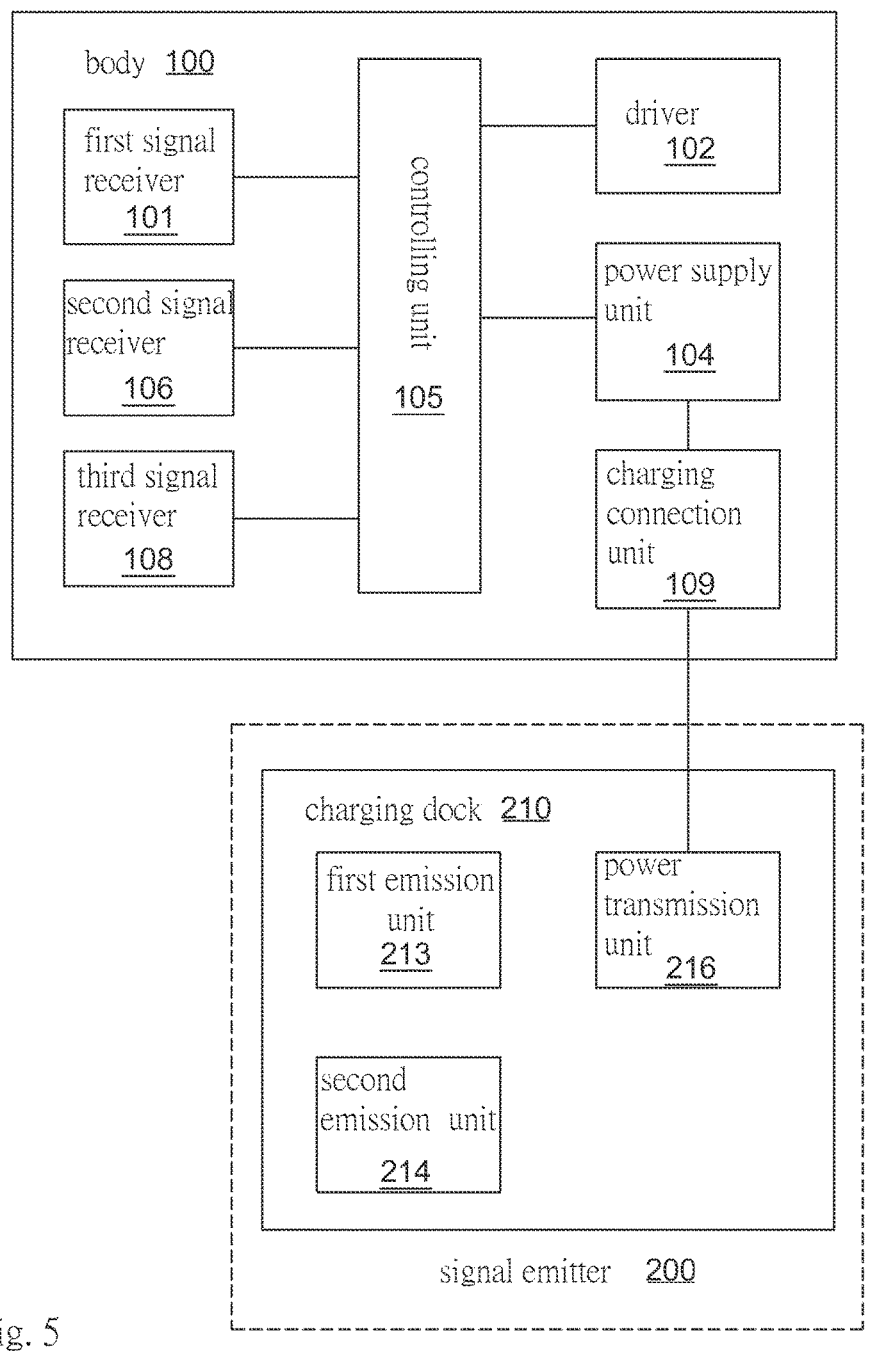
FIG. 5 shows a block diagram of a signal guided cleaning device and a charging dock of present application.
Figure 6:
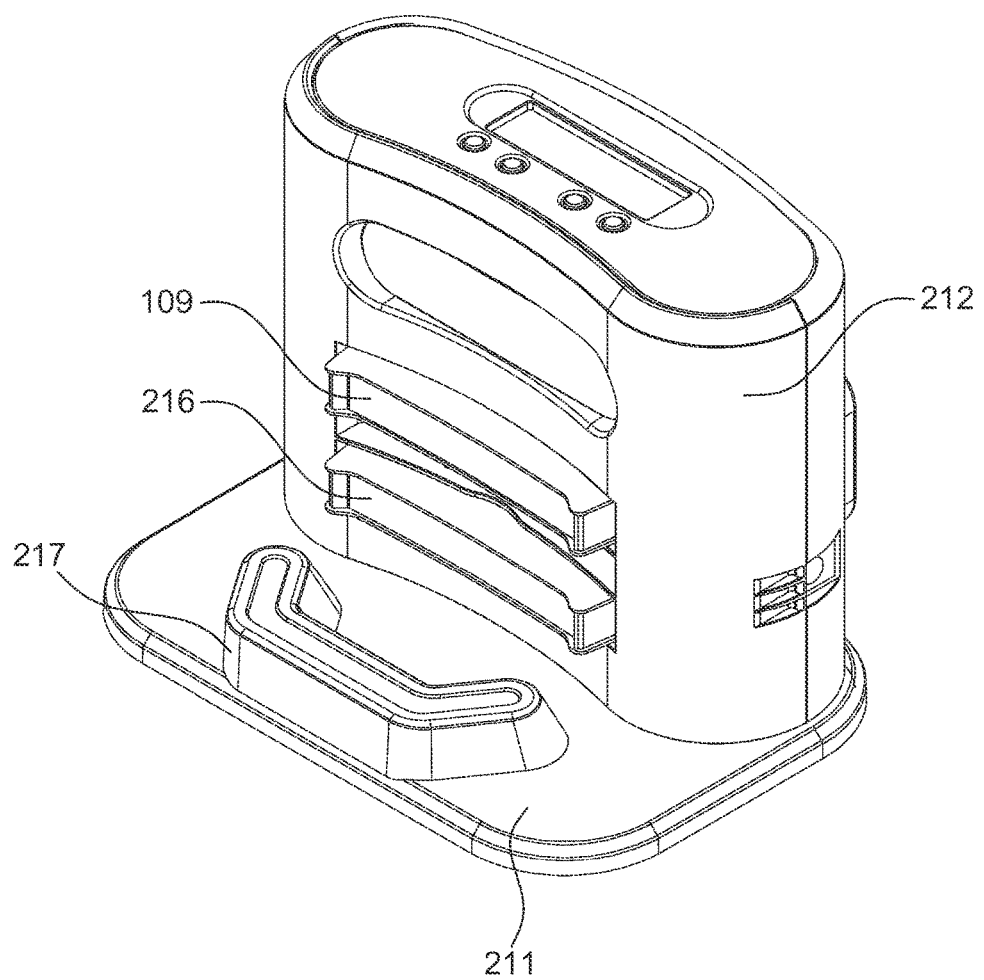
FIG. 6 shows a perspective view of a charging dock of present application.

Please refer to FIG. 4 which illustrates the signal emitter 200 is a hand-held remote control device 220 comprising a first emission unit 221 and an illuminant unit 222. The first emission unit 221 sends the first emission signals along the direction identical to a light beam from the illuminant unit 222. As such, a light beam projected on the ground from the hand-held remote control device 220 under control of a user is implied as a location to project the first emission signals; the body 100 under functions of the first signal receivers 101, the drivers 102 and the mobile elements 103 moves with the light beam as described.

As shown in FIGS. 1, 3, 5 and 6 for another embodiment of a signal guided cleaning device, the body 100 comprises a first connection unit 107 configured on underneath of body 100 and opposite to edges of the first signal receivers 101. And the signal emitter 200 is a charging dock 210 comprising a base 211, a prop 212, first emission units 213, a second emission unit 214, a second signal receiver 106, a power transmission unit 216 and an outer second connection unit 217 which is located between the base 211 and the prop 212 and connected to the first connection unit 107 for joining the charging dock 210 and the body 100.

Figure 7:
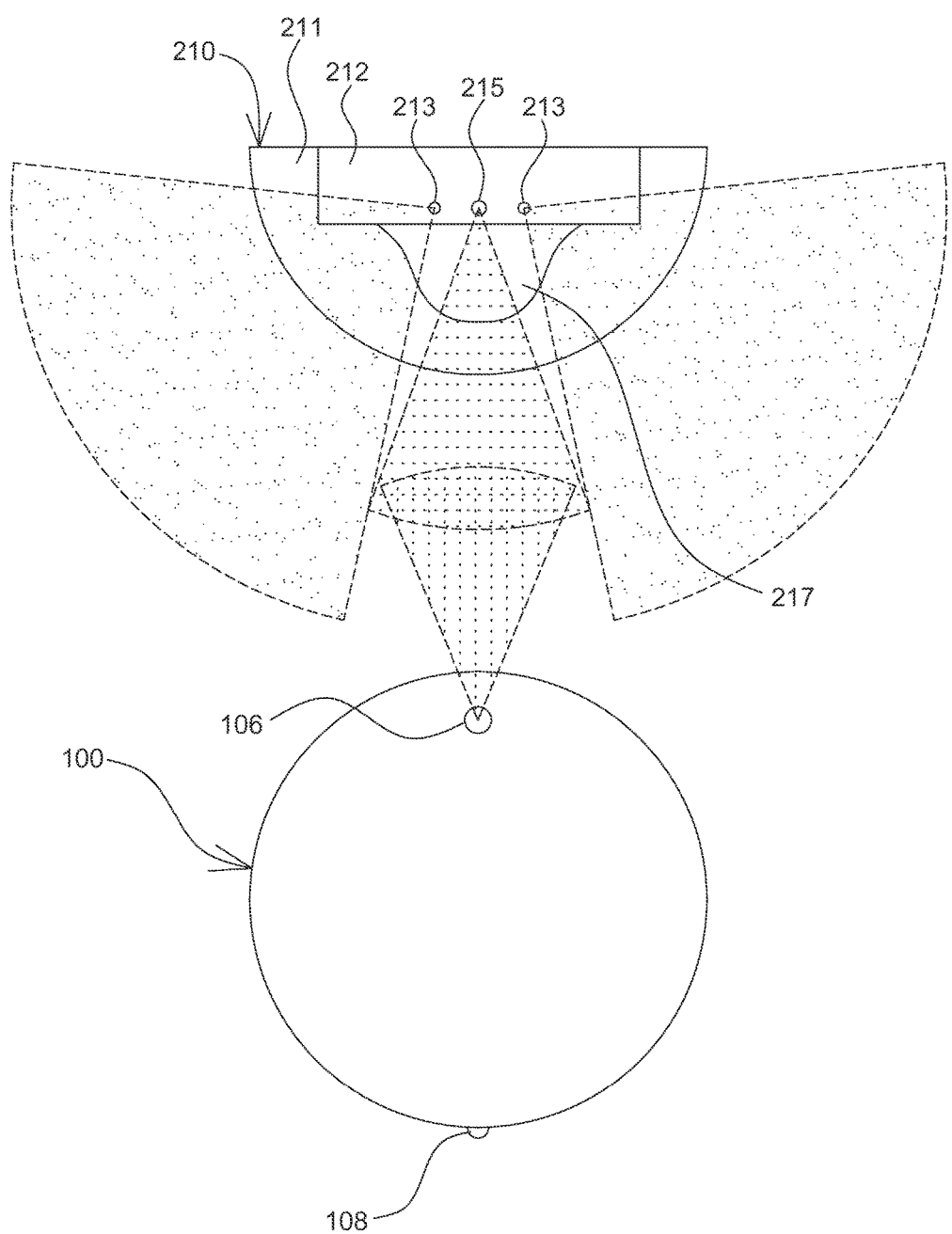
FIG. 7 shows a schematic view illustrating emission ranges of first and second emission units and reception ranges of a second signal receiver in a signal guided cleaning device of present application.

As shown in FIG. 7, the first emission units 213 configured on the prop 212 send first emission signals at a predetermined angle and away from the prop 212 without overlaps of the first emission signals in their emission ranges.

Moreover, a charging connection unit 109 configured on the lateral side of the body 100 and opposite to the first signal receivers 101 is connected to the power supply unit 104 and taken as a conductive terminal or an electricity reception end for wireless charging; the power transmission unit 216 as a conductive terminal or an electricity output end is developed on the prop 212 and appropriately links the charging connection unit 109, transmitting externally received electricity to the charging connection unit 109, the power supply unit 104, the controlling unit 105 and the drivers 102 for power transmission and storage when the signal guided cleaning device is shifted to the charging dock 210.

Please refer to FIG. 7 again which illustrates the charging dock 210 further comprises a second emission unit 215 configured on the prop 212 and sends the second emission signals transmitted within a range less than that of the first emission signals.

Figure 3:
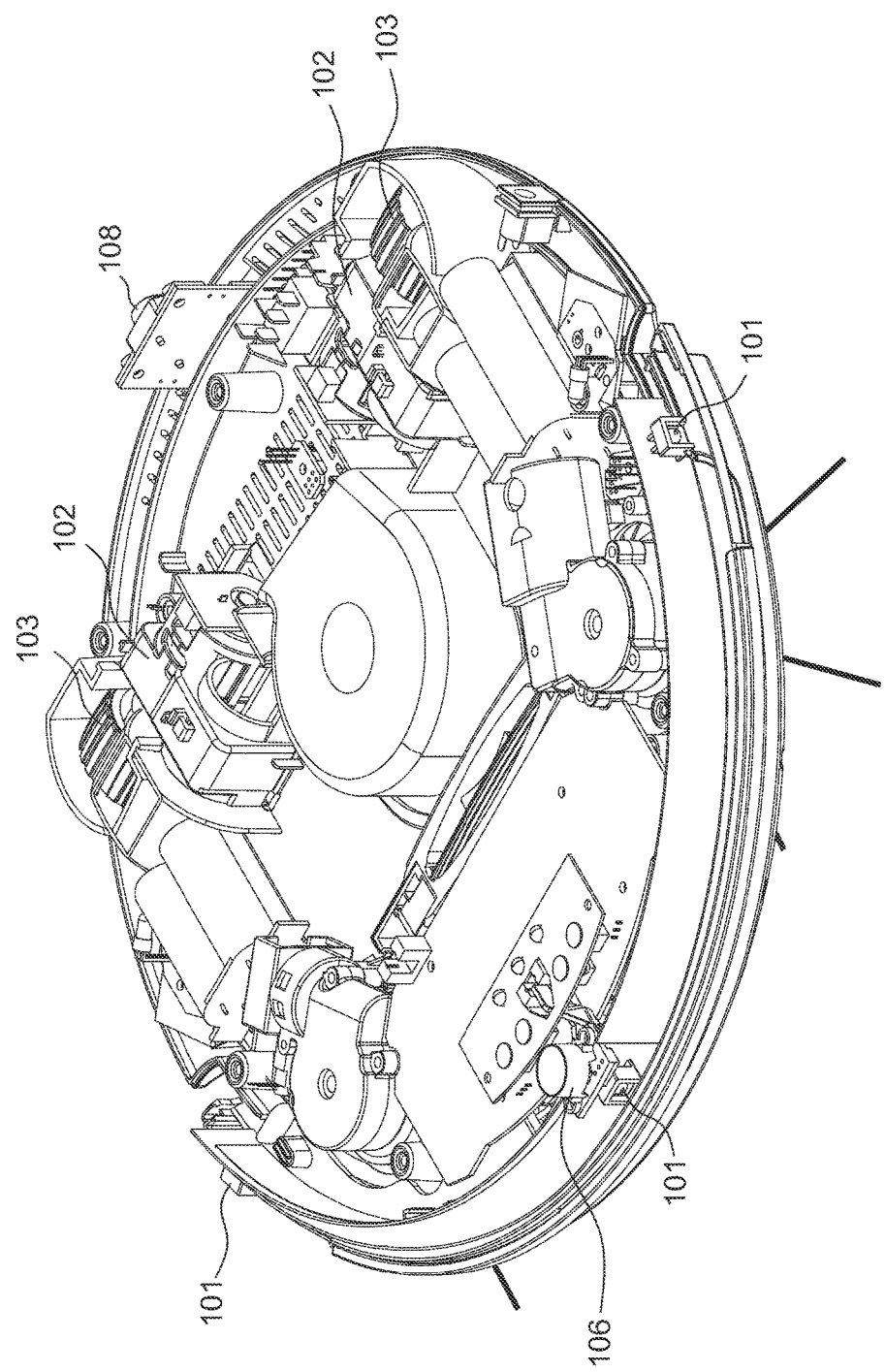
FIG. 3 shows another schematic view of a signal guided cleaning device of present application.
Figure 8:
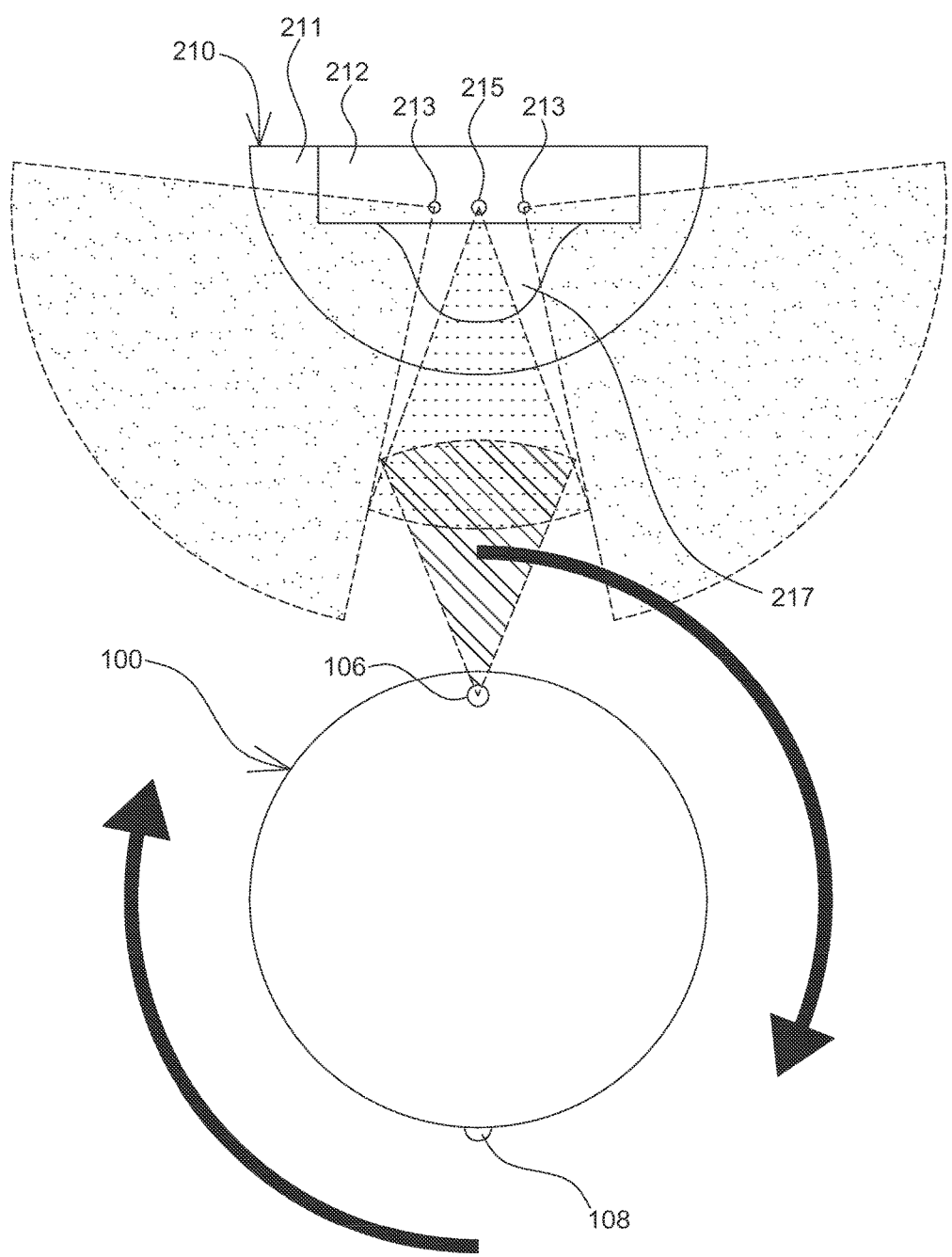
FIG. 8 shows a schematic view illustrating a signal guided cleaning device turning on the ground of present application.

Please refer to FIGS. 3 and 8 which illustrate a second signal receiver 106 configured on the top of the body 200. The signal guided cleaning device selects first signal receiver 101 or second signal receiver to receive second emission signal. The controlling unit 105 creates second controlling instructions based on the second reception instructions and the drivers 102 make output of a corresponding driving speed according to the received second controlling instructions and drive the mobile elements 103 to either move/turn the body 100. Or the drivers 102 selects first signal receiver 101 or second signal receiver 106 to receive second emission signal to drive the mobile element moving and turning, until the charging connection forward to the charging dock.

Please refer to FIGS. 3 and 8 again which illustrate a signal guided cleaning device further comprises a third signal receiver 108 on the lateral side of the body 100 and away from the first signal receivers 101. The controlling unit 105 of the signal guided cleaning device creates third controlling instructions based on the third reception instructions, and the drivers 102 enable the mobile elements 103 to either move the body 100 toward the charging dock 210 according to the received third controlling instructions. Or the drivers 102 receive the external second emission signal by the third signal receiver 108 and provide a corresponding third reception instruction, and drive the mobile element 103 toward the charging dock 210 according to the third reception instruction.

Figure 9:
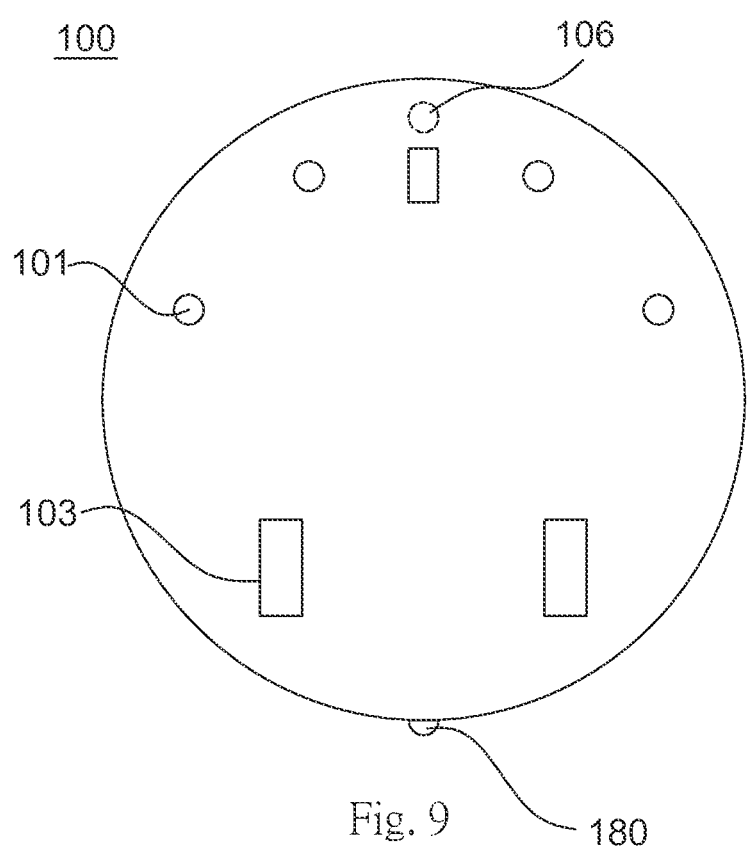
FIG. 9 shows a top view of a body of a signal guided cleaning device of present application.

Please refer to FIG. 9 that illustrates the body 100 in one embodiment comprises four first signal receivers 101 such as directional infrared receivers, radio frequency signal receivers, etc. uniformly distributed on the bottom side and edges of the body 100 on which the second signal receiver 106 such as omni-directional infrared receiver, radio frequency signal receiver, etc. The body 100 is provided with the third signal receiver 108 such as directional infrared receiver, radio frequency signal receiver, etc. sideward and opposite to the second signal receiver 106.

Figure 10:
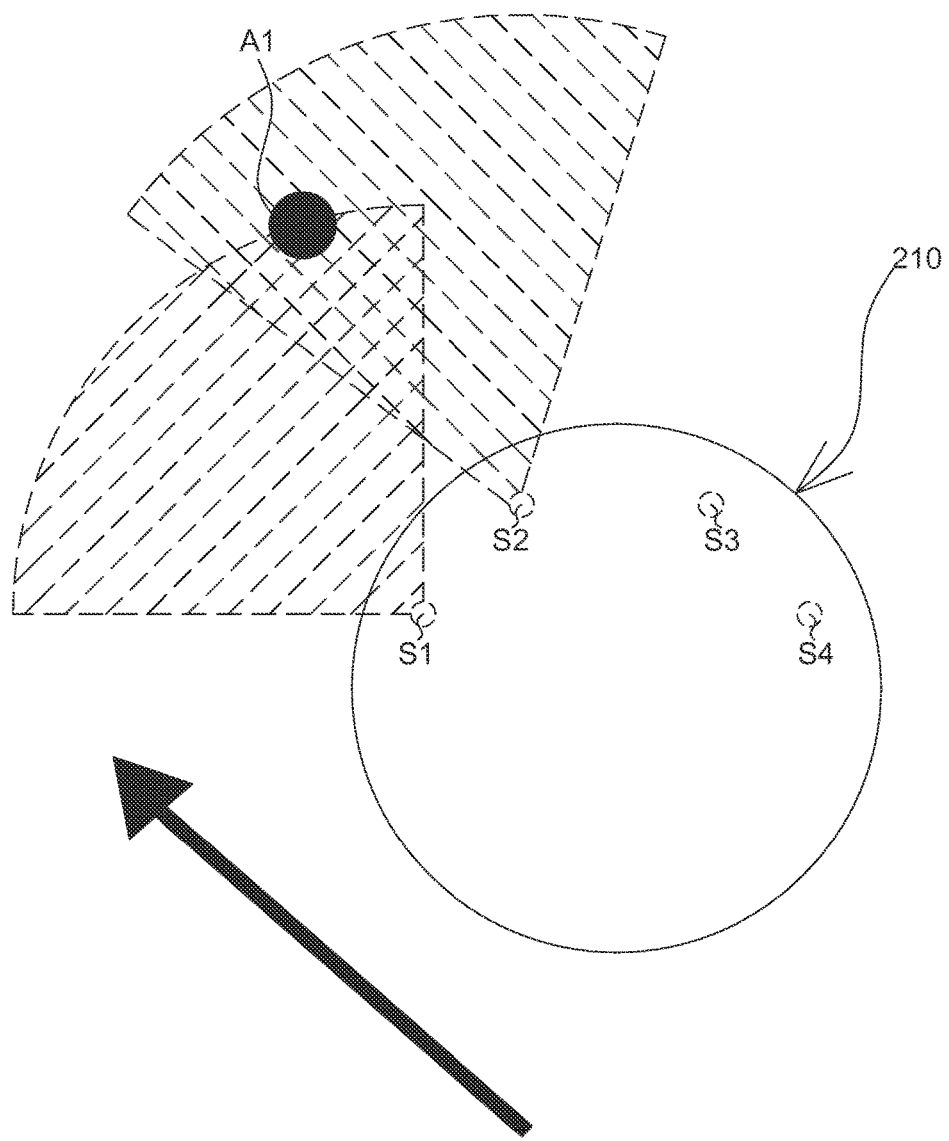
FIG. 10 shows a schematic view illustrating a signal guided cleaning device moving toward a location at which a light beam is projected of present application.
Figure 11:
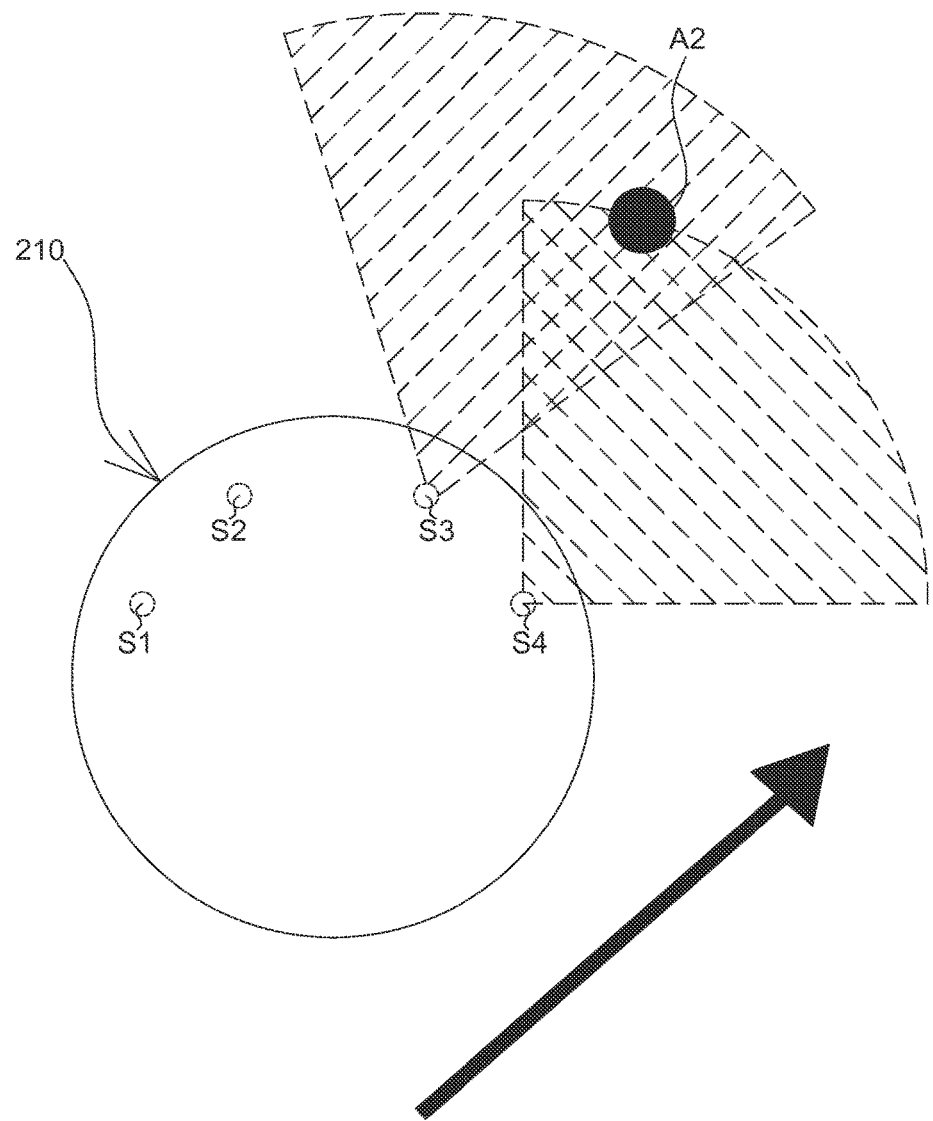
FIG. 11 shows another schematic view illustrating a signal guided cleaning device moving toward a location at which a light beam is projected.

Please refer to FIGS. 10 and 11 that illustrate the first signal receivers 101 indicated as S1, S2, S3 or S4 receive the first emission signals from location A1 on which a light beam is projected and the first emission signals are coded signals, i.e., infrared signals or radio frequency signals, transmitted to and analyzed with the controlling unit 105 for creation of at least one first controlling instruction to be translated to the drivers 102 and used in driving the mobile elements 103 toward location A1. As shown in FIG. 10, the first signal receivers at S1 and S2 receive the first emission signals from the location on which a light beam is projected and within the detection ranges of the first signal receivers at S1 and S2 and the received first emission signals are transmitted to and analyzed with the controlling unit 105 by comparing different levels of intensity of the first emission signals received by the first signal receivers 101 at S1 and S2 for creation of the corresponding first controlling instructions used in driving the drivers 102 to move the mobile elements 103 toward location A1 on which a light beam is projected. As shown in FIG. 11, location A2 on which a light beam is projected is situated within the range of the first emission signals received by the first signal receivers 101 at S3 and S4 so that the body 100 is shifted to location A2. In practice, the first signal receivers 101 may be three rather than four signal receivers as shown in FIG. 3.

Figure 12:
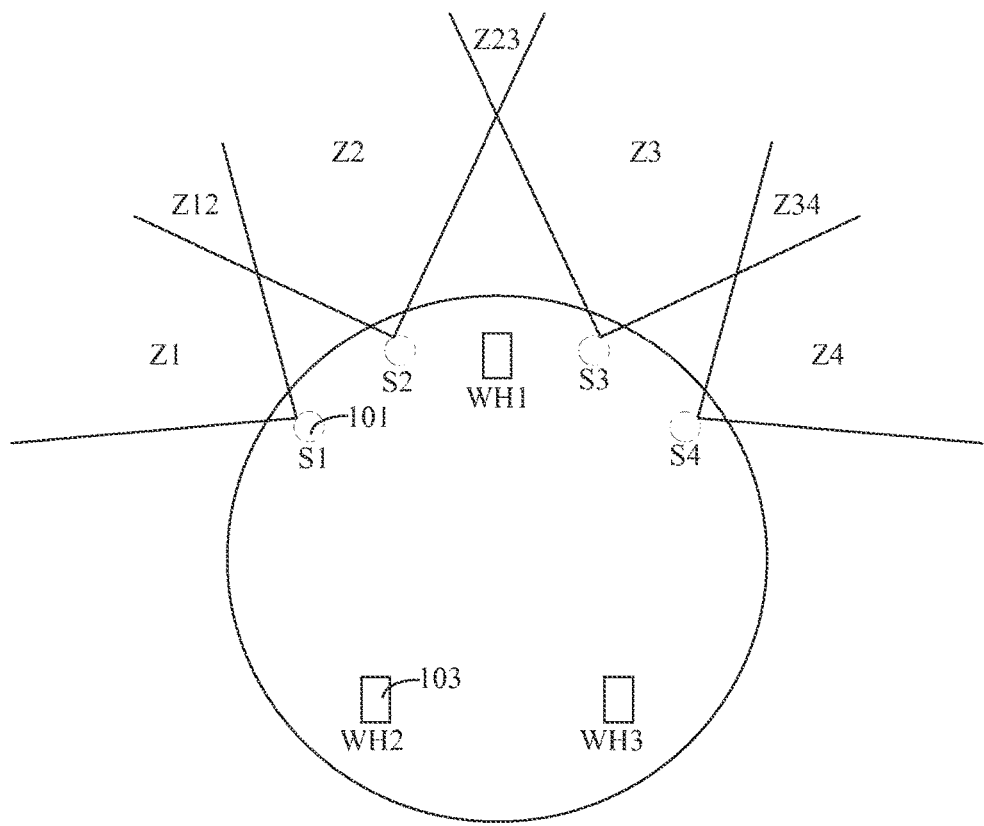
FIG. 12 shows another schematic view illustrating a signal guided cleaning device moving toward a location at which a light beam is projected.

FIG. 12 shows a processing aspect view that the first signal receivers 101 receive the first emission signal. The first signal receivers 101 are configured at the position S1, S2, S3, and S4 respectively and the mobile elements are configured at the position WH1, WH2, WH3, and WH4. The determining of the first signal of present processing aspect is based on first signal receiver whether receiving the first emission signal, and divides the receiving region of first signal receivers 103 into receiving region Z1, Z12, Z2, Z23, Z3, Z34 and Z4 based on the signal receiving region. The relationship of each receiving region and first signal receivers as shown in Table 1:

TABLE 1

| receiver received the first signal | corresponding receiving region |
|---|---|
| S1 | Z1 |
| S1, S2 | Z12 |
| S2 | Z2 |
| S2, S3 | Z23 |
| S3 | Z3 |
| S3, S4 | Z34 |
| S4 | Z4 |

After receiving the signal, the controlling unit 105 sets driving velocity of the mobile element 103 according to the combined status of signal receiving. The aforementioned driving velocity comprises speed V0 (the minimum velocity), V1, V2, and V3 (the maximum velocity). The receiving status of first signal receiver 101 is marked logic "1" when received the first emission signal; and the receiving status of first signal receiver 101 is marked logic "0" when not received the first emission signal. The signal receiving combination status of first signal receiving 101 as shown in Table 2:

TABLE 2

|  | S1 | S2 | S3 | S4 | WH1 | WH2 | WH3 |
|---|---|---|---|---|---|---|---|
| Z1 | 1 | 0 | 0 | 0 | V0 | V2 | V |
| Z12 | 1 | 1 | 0 | 0 | V0 | V1 | V3 |
| Z2 | 0 | 1 | 0 | 0 | V1 | V2 | V3 |
| Z23 | 0 | 1 | 1 | 0 | V1 | V1 | V1 |

TABLE 2-continued

|     | S1 | S2 | S3 | S4 | WH1 | WH2 | WH3 |
|-----|----|----|----|----|-----|-----|-----|
| Z3  | 0  | 0  | 1  | 0  | V3  | V2  | V1  |
| Z34 | 0  | 0  | 1  | 1  | V3  | V1  | V0  |
| Z4  | 0  | 0  | 0  | 1  | V3  | V2  | V0  |

When the controlling unit 105 received signal, it may determines the signal of S1~S4 by the positive logic or negative logic so as to know the located position of the first emission position. For example, the controlling unit 105 determines the first signal receiver 101 based on positive logic, and determines which first signal receiver 101's status involving the logic "1" so as to know the related region. On the contrary, the controlling unit 105 also determines the first signal receiver 101 based on negative logic, and determines which first signal receiver 101's status involving logic "0" so as to know the related region.

For example, when the controlling unit 105 receives a relation status of first signal is {S1, S2, S3, S4}={1,1,0,0}, then the controlling unit 105 determines the status by positive logic or negative to known the first signal is located on region "Z12", then the controlling unit 105 sets driving velocity of mobile element as follow: {WH1, WH2, WH3}={V0, V1, V3} so as to make the signal guided cleaning device move to the direction of Z12 based on mobile elements 103 with different driving velocity.

Please refer to FIGS. 7 and 8 again. First of all, second emission signals are transmitted from the second emission unit 214 in the charging dock 210 and received by the second signal receiver 106 which translates the second emission signals to the controlling unit 105 for creation of the second controlling instruction by which the drivers 102 enable the mobile elements 103 to turn until the third signal receiver 108 faces the charging dock 210. The second emission signals are received by the third signal receiver 108 and transmitted to the controlling unit 105 for creation of the third controlling instruction by which the drivers 102 enable the mobile elements 103 to move toward the charging dock 210.

Figure 13:
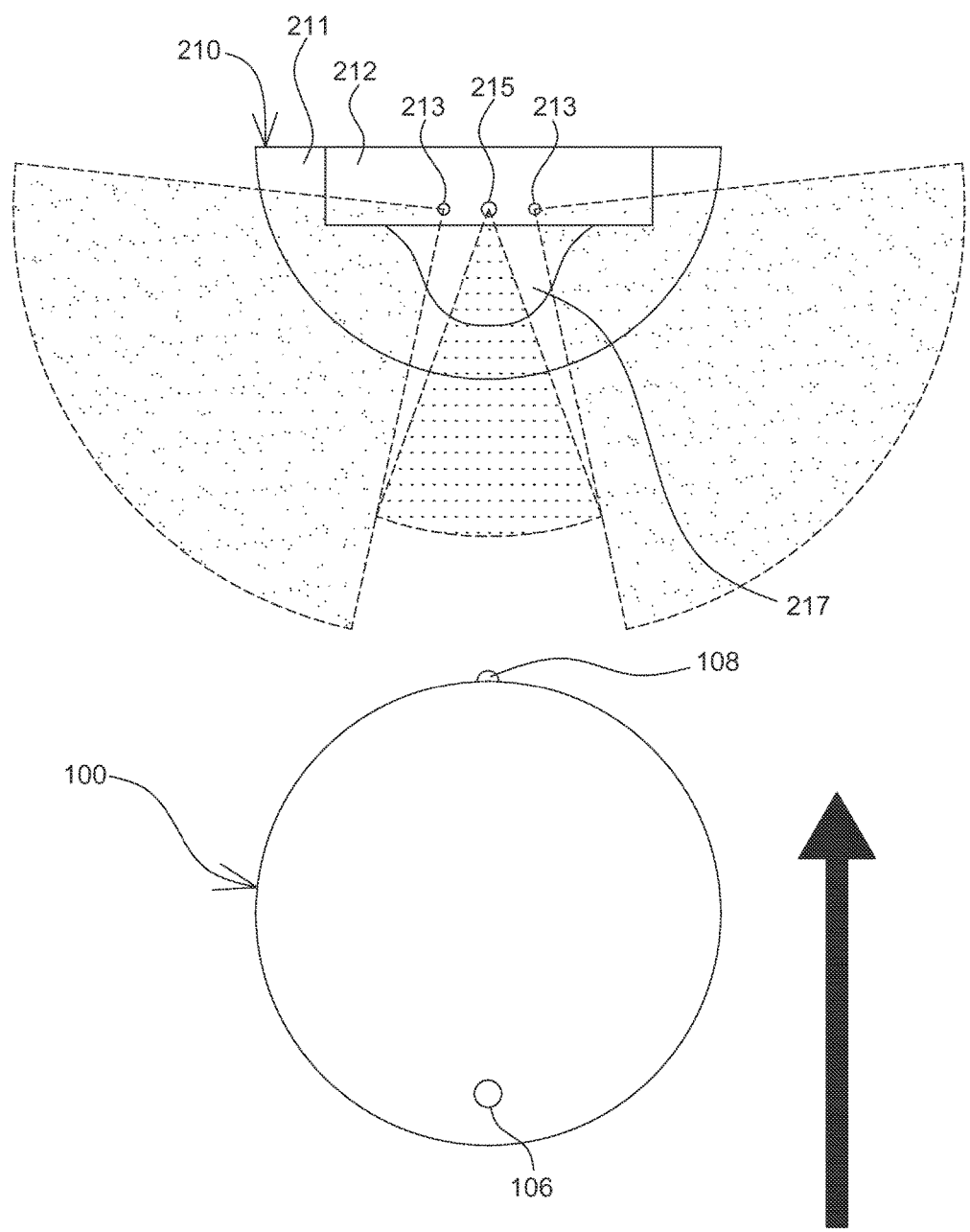
FIG. 13 shows a schematic view illustrating a signal guided cleaning device moving toward a charging dock.
Figure 14:
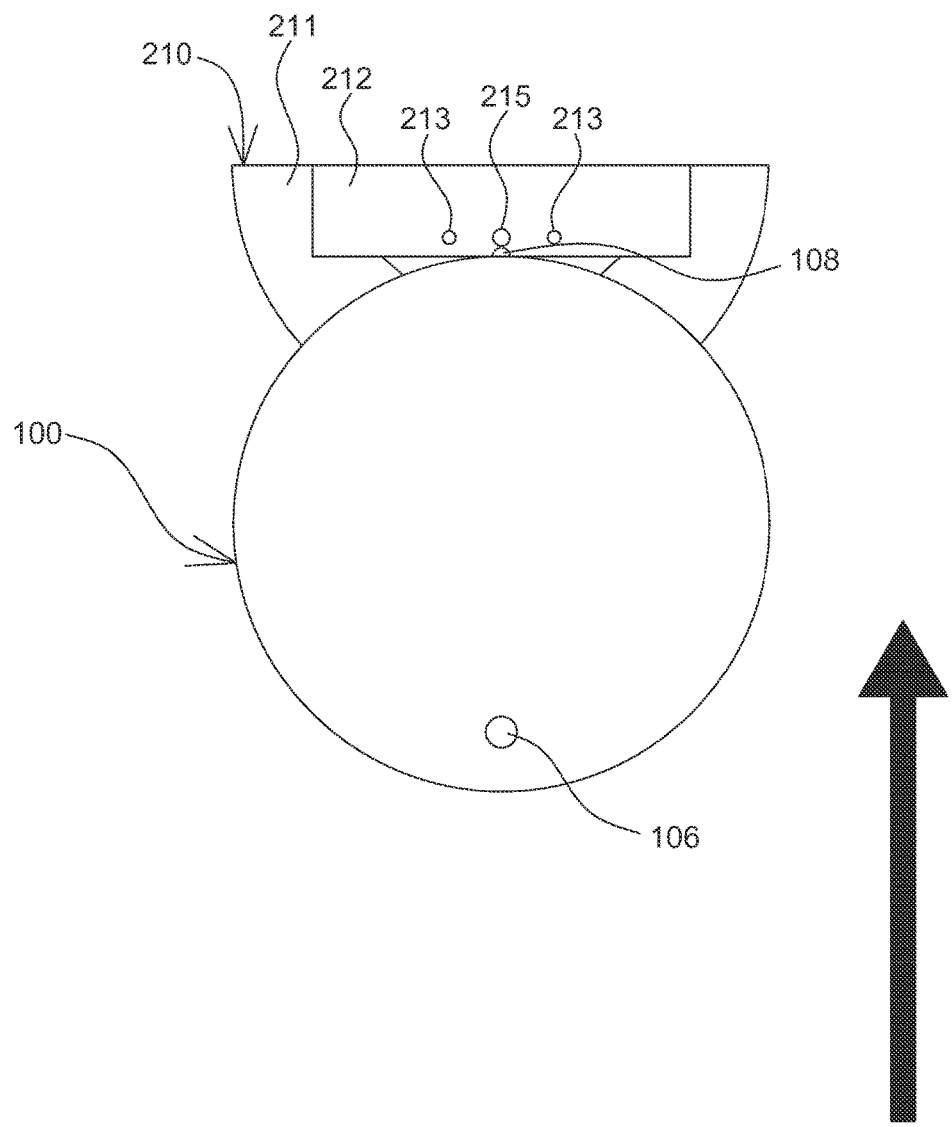
FIG. 14 shows a schematic view illustrating a signal guided cleaning device linking a charging dock.

Please refer to FIGS. 13 and 14. Next, the second emission signals that are continuously received by the third signal receiver 108 when the body 100 moves toward the charging dock 210 enable the controlling unit 105 to generate the third controlling instruction by which the drivers 102 change the mobile elements 103 in angle and direction, keeping the body 100 move toward the charging dock 210 as shown in FIG. 13. Finally, the body 100 links the charging dock 210 for power transmission with the first connection unit 107 and the second connection unit 217 matching and joining together, as shown in FIG. 14.

The above descriptions are examples of preferred embodiments which do not restrict the scope of a signal guided cleaning device; any equivalent change or improvement without departing from spirit of the signal guided cleaning device should be incorporated in claims herein It can be seen from above descriptions the signal guided cleaning device with effects and advantages over conventional cleaning devices meets patentability including novelty and non-obviousness.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A signal guided cleaning device, comprising:
a body;
four first signal receivers, configured on a surface of the body wherein a first emission signal within a detection range of at least one first signal receiver is received to provide a first reception instruction and the first emission signal is a digital encoded signal;
three mobile elements, configured on the body's bottom side;
a driver, configured in the body, connected to the mobile elements, and based on the first reception instruction to drive a mobile element and further the body toward a direction from which the first emission signal originates;
a controlling unit, configured in the body and electrically connected to the first signal receivers and the driver, and according to the first reception instruction to provide a first controlling instruction, the first controlling instruction being transmitted to the driver, the driver outputting a driving velocity based on the first controlling instruction, making the driver to driver the mobile element so as to move and rotate the body by the mobile element; and
a power supply unit, configured in the body providing electric power to the first signal receivers, the controlling unit, and the driver,
wherein when the first emission signal is located in Z1, only one first signal receiver S1 receives the first emission signal, the controlling unit sets the driving velocity as (VO, V2, V3) with respect to the three mobile elements (WH1, WH2, Wh3); when the first emission signal is located in Z12, two first signal receivers S1 and S2 receive the first emission signal, the controlling unit sets the driving velocity of as (VO, V1, V3) corresponding to (WH1, WH2, Wh3); when the first emission signal is located in Z2, only one first signal receiver S2 receives the first emission signal, the controlling unit sets the driving velocity as (V1, V2, V3) with respect to the three mobile elements (WH1, WH2, Wh3); when the first emission signal is located in Z23, two first signal receivers S2 and S3 receive the first emission signal, the controlling unit sets the driving velocity of as (V1, V1, V1) corresponding to (WH1, WH2, Wh3); when the first emission signal is located in Z3, only one first signal receiver S3 receives the first emission signal, the controlling unit sets the driving velocity as (V3, V2, V1) with respect to the three mobile elements (WH1, WH2, Wh3); when the first emission signal is located in Z34, two first signal receivers S3 and S4 receive the first emission signal, the controlling unit sets the driving velocity of as (V3, V1, VO) corresponding to (WH1, WH2, Wh3); and when the first emission signal is located in Z4, only one first signal receiver S4 receives the first emission signal, the controlling unit sets the driving velocity as (V3, V2, VO) with respect to the three mobile elements (WH1, WH2, Wh3).

2. The device as claimed in claim 1, further comprising:
a second signal receiver, configured on the top plane of the body;
wherein, the signal guided cleaning device further selects the first signal receiver or the second signal receiver to receive an external second emission signal; and wherein, the driver turns the mobile element when the second signal receiver receives the second emission signal.

3. The device as claimed in claim 2, further comprising a third signal receiver configured on the body and opposite to position of the first signal receivers; the drivers enabling the at least one mobile element to move toward an emitting position of the third emission signal when the third signal receiver receives the second emission signal.

4. The device as claimed in claim 1, further comprising:
a second signal receiver, configured on the top plane of the body and the signal guided clean device selecting the first signal receiver or the second signal receiver to receive an external second emission signal;
wherein, the at least one driver selects the plurality of first signal receivers or the second signal receiver to receive the second emission signal, and the at least one driver drives the at least one mobile element to change direction.

5. The device as claimed in claim 1, further comprising a third signal receiver configured on the top plane of the body and opposite to the first signal receivers; the drivers enabling the mobile elements to move toward an emission direction of an external second emission signal when the third signal receiver receiving an external second emission signal.

6. The device as claimed in claim 1, wherein the at least one driver connects to at least one of the plurality of first signal receivers, the at least one driver drives the connected mobile elements turning according to the receiving first receiving signal;
wherein, a signal intensity of the first receiving signal is inversely proportional to a distance from origination of the first emission signal to the first signal receiver.

7. A signal guided cleaning system, comprising:
a signal emitter, configured to send at least one first emission signal;
a signal guided cleaning device, comprising:
a body;
four signal receivers configured on the body, wherein at least one first signal receiver receives first emission signals from the signal emitter within their detection ranges for creation of a plurality of first reception instructions;
three mobile element§, configured on the bottom side of the body;
a driver configured in the body, connected to the mobile elements, and based on the first reception instructions to drive the connected mobile elements and further the body toward a direction from which the first emission signals originate; and
a power supply unit, configured in the body and providing electric power to the signal receivers as well as the driver,
wherein when the first emission signal is located in Z1, only one first signal receiver S1 receives the first emission signal, the controlling unit sets the driving velocity as (VO, V2, V3) with respect to the three mobile elements (WH1, WH2, Wh3); when the first emission signal is located in Z12, two first signal receivers S1 and S2 receive the first emission signal, the controlling unit sets the driving velocity of as (VO, V1, V3) corresponding to (WH1, WH2, Wh3); when the first emission signal is located in Z2, only one first signal receiver S2 receives the first emission signal, the controlling unit sets the driving velocity as (V1, V2, V3) with respect to the three mobile elements (WH1, WH2, Wh3); when the first emission signal is located in Z23, two first signal receivers S2 and S3 receive the first emission signal, the controlling unit sets the driving velocity of as (V1, V1, V1) corresponding to (WH1, WH2, Wh3); when the first emission signal is located in Z3, only one first signal receiver S3 receives the first emission signal, the controlling unit sets the driving velocity as (V3, V2, V1) with respect to the three mobile elements (WH1, WH2, Wh3); when the first emission signal is located in Z34, two first signal receivers S3 and S4 receive the first emission signal, the controlling unit sets the driving velocity of as (V3, V1, VO) corresponding to (WH1, WH2, Wh3); and when the first emission signal is located in Z4, only one first signal receiver S4 receives the first emission signal, the controlling unit sets the driving velocity as (V3, V2, VO) with respect to the three mobile elements (WH1, WH2, Wh3),
wherein the signal emitter is a hand-held remote control device comprising:
an illuminant unit, configured at a front-end of the hand-held remote control device and emitting a light beam outward; and
a first emission unit, configured at the front-end of the hand-held remote control device and sending the first emission signals;
wherein, a transmission direction of the first emission signals is identical with a direction of the light beam, so that when a light beam is projected on a ground from the hand-held remote control device under control of a user, the light beam on the ground is implied as a location to project the first emission signals, and the signal guided cleaning device thereby moves toward the location where the light beam is projected.

8. The system as claimed in claim 7, wherein the signal guided cleaning device further comprises a charging connection unit linking the power supply unit and receiving external electric power which is charged into the power supply unit for storage.

9. The system as claimed in claim 7, wherein the at least one driver further configuring driving velocity of the driver according to status of the first signal receivers whether receiving the first emission signal.

* * * * *